Figure 1:
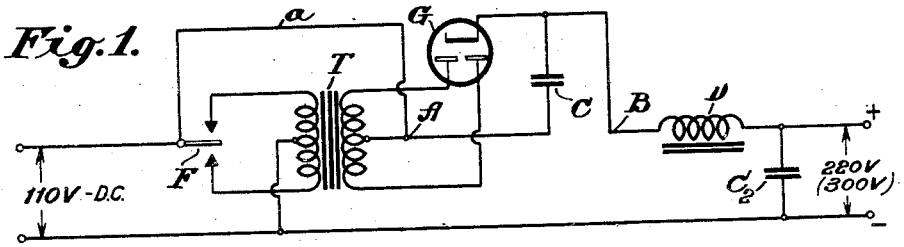

Sept. 28, 1943.  A. LEIFER  2,330,500

POWER SUPPLY CIRCUIT

Filed Feb. 15, 1941

INVENTOR
Alfred Leifer
BY
ATTORNEY

Patented Sept. 28, 1943

2,330,500

UNITED STATES PATENT OFFICE 2,330,500

POWER SUPPLY CIRCUIT

Alfred Leifer, Berlin, Germany; vested in the Alien Property Custodian

Application February 15, 1941, Serial No. 379,094
In Germany August 7, 1939

3 Claims. (Cl. 171—97)

It is known to transform a direct potential to a higher direct potential by converting the direct potential into an alternating potential in a vibrating converter with vibrating spring and by stepping up the said alternating voltage at the same time in the transformer of the converter and finally rectifying it again. This problem of a step-up transformation of the direct voltage exists for instance if a receiver adapted for connecting to a direct voltage source of 220 volt is to be operated with a direct voltage of 110 volts. The chopper of the vibrating converter must then transmit a considerable power for instance 80 watts. Therefore, the life of the contacts of the chopper is greatly shortened.

The present invention aims at eliminating this difficulty.

Thus the invention resides in a circuit arrangement with a vibrating converter and a following rectifier, more especially for connecting a receiver or amplifier to a direct current network. In accordance with the present invention the direct voltage obtained through the direct current-direct current transformation is placed in series to the original direct voltage. This sum of the voltages is utilized as a stepped-up direct voltage.

The chopper of the vibrating converter no longer need transmit the full power when applying the invention, but only the power which corresponds with the difference in voltage.

In order further to reduce the power to be transformed in the case of connecting a receiver or amplifier the heating current for the tubes is preferably derived directly from the network such as is hitherto customary in universal current receivers. In this way an especially considerable decrease of the power to be transformed is attained since the direct current-direct current transformer is to furnish only that part of the plate voltage power which corresponds with the difference in voltage between the network voltage and the nominal voltage of the apparatus. In this type of current supply of an apparatus the further advantage is obtained that the receiver and amplifier can be built for connection to the direct current network whereby the plate voltage is higher than the network voltage for instance 300 volts.

This principle of the current supply may even be extended to a point whereby the same receiver or amplifier can also be connected to an alternating current network in that in place of the direct current-direct current transformer a detector is connected ahead of the apparatus, or inserted into the apparatus. Such a universal current receiver thus could be constructed such that solely the network part would have to be exchanged for the supply of the plate voltage. Then at all network voltages the same plate voltage would be obtained also at 110 volt direct voltage. The power to be transformed with a chopper in the case of connection to the direct current network would on account of the present invention, then be considerably lower than in the arrangement referred to at the beginning. Even a further step may hereby be taken by rendering the said network section operable by switching, instead of interchangeable in that the transformer of the vibrating converter as well as the detector to be connected are utilized also in the case of the connection to the alternating current network so that then solely the chopper is to be put out of operation, or to be removed.

Figure 2:
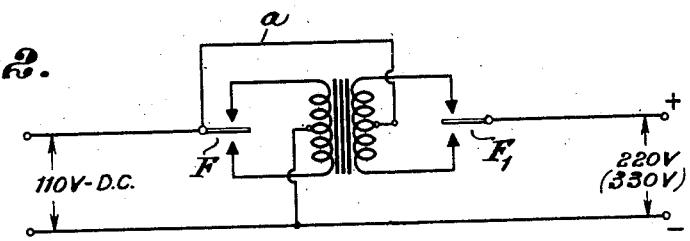
Figure 3:
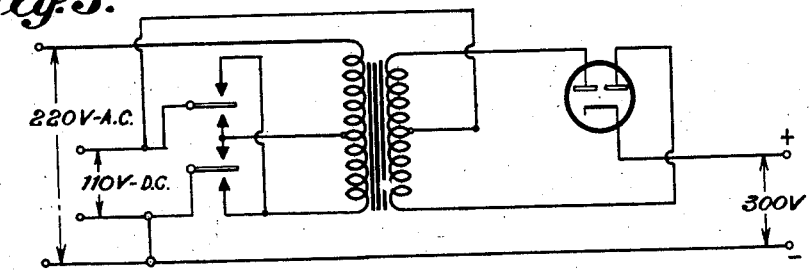
Figure 4:
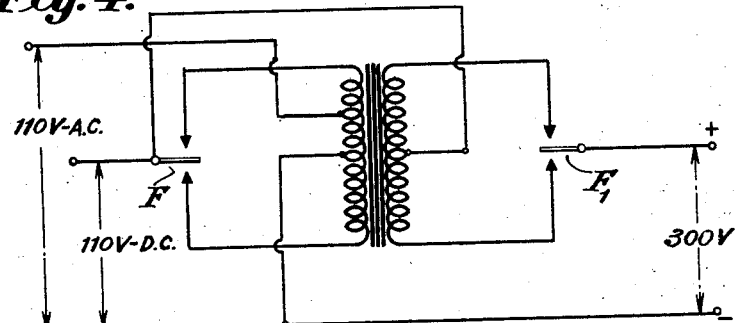

The invention will be explained in reference to the accompanying figures. The figures 1 and 2 show direct current-direct current transformers according to the present invention and the Figures 3 and 4 show such direct current transformers in which the transformer and the detector are utilized as detectors at the connection to the alternating current network.

In Figure 1 the direct current network of for instance 110 volts is connected at the left, and at the right there is derived a direct voltage of for instance 220 volts for a direct current receiver. The vibrating converter comprises a chopper of the hitherto customary type with the following transformer T. The alternating voltage derived from the transformer is detected in the detector G so that a direct voltage appears between the points A and B. This direct voltage is placed by means of the line $a$ in series to the original network voltage. The filter condenser C can be connected in parallel to the transformed direct voltage, or in parallel to the sum of the direct voltages. The sum of the voltages is then filtered out by means of the choke D and condenser since also the original direct voltage ordinarily contains an additional alternating voltage part.

The circuit according to the present invention differs from the known circuit by the presence of the line $a$, whereas in the known circuit a connection exists between point A and the lower network line.

If in the said advantageous form of construction according to the invention the power for heating the tubes is not passed across this direct current-direct current transformer, the transformation ratio of the transformer T will suitably be so chosen that an increased output voltage, for instance 300 volts, is obtained which serves then as plate voltage. At connecting to a direct current network of 110 volts the transformer would then have to furnish an additional voltage of about 200 volts, while at connecting to a direct current network it would have to furnish an additional voltage of about 100 volts. The voltages can be given in approximation only since a voltage loss occurs especially in the detector. This choice of the voltages is particularly advantageous since in the first case the transformer steps up in the ratio 1:2 and in the second case it steps down in the ratio 2:1. Hence, it is only necessary to interchange the primary side and secondary side of the transformer while no additional tappings need be provided.

If the same receiver is to be fed from the alternating current network it is necessary to put in place of the arrangement according to Figure 1, a special transformer with detector, or the converter according to Figure 1 is adapted for switching while the actual transformer is provided with such tappings whereby the converter can with the omission of the chopper serve as detector for the plate voltage supply (see below Figure 3).

Figure 2 differs from Figure 1 in that in place of the tube detector a vibrating rectifier is provided. The spring F of the chopper and the spring $F_1$ of the rectifier can hereby be combined in a known manner to have a single spring. Also in this case the converted direct potential is connected by lines in series to the original direct potential. Otherwise what has been stated in reference to Figure 1 pertains also to the above solution. The exciter coil for the movement of the vibrating organ is herein omitted just as in the other figures and will be connected in the known manner.

Figure 3 shows an example for a converter according to the present invention whose transformer and rectifier are utilized in case of operation with alternating current. In order to avoid the push-pull coil at the primary side, a chopper with alternating polarity (alternating chopper, pole changer) is provided. As indicated, when connected to a direct current network, one set of connections is utilized; and, when connected to an alterntaing current network, another set of connections is utilized. Furthermore, when connected to an alternating current network, the lower network line is connected directly to the lower line of the output circuit and also through a lead to the lower terminal of the primary winding of the transformer. When connected to a direct current network, the connection between the lower output line and the transformer winding is broken and the lower line of the direct current network is connected through a lead to the lower line of the output circuit. For the sake of clearness the switches are not shown. When employing other voltages the tappings at the transformer must be changed accordingly. From the output terminals a direct plate potential of for instance 300 volts is derived, while the heating power is taken directly from the network.

Figure 4 shows a further development of the Figure 2 in that the transformer and the vibrating rectifier are utilized also at the operation with alternating current. The reversing switch and the further tappings for other network voltages are not shown. If as vibrating rectifier (with the spring $F_1$) one of the now customary chopper systems would be employed, the vibrating rectifier would not operate at connection to the alternating current network. At the connection to the alternating current network the drive of the spring $F_1$ can be coupled mechanically or electrically with the drive of the spring F, while at connection with the alternating current network the chopper with the spring F is out of operation. However, the operation of the vibrating rectifier is rendered possible by inserting a rectifier into the lead-in of the exciter coil for the spring $F_1$ thereby suppressing for instance the negative alternations of the alternating current supplied to the exciter coil. In place of this the exciter coil could also be controlled across an auxiliary contact at the spring $F_1$ whereby one alternation will be suppressed.

In order to maintain a fair load of the contacts the contacts pertaining to the chopper and rectifier can be placed in parallel at connection to the alternating current network so that in this case the contacts of the chopper can be utilized for the detection.

When employing the circuit with alternating polarity at the primary side and secondary side whereby two choppers with alternating polarity (four pole chopper) are coupled together mechanically, or electrically (eight pole chopper) advantages are obtained in regard to the structure and size of the transformer, especially where several tappings are used.

What I claim is:

1. In a power supply system for supplying direct current to a load where direct current of a lower voltage is available, a pair of input terminals adapted to be connected to the means constituting the source of direct current, a pair of output terminals adapted to be connected to the means constituting the load, a transformer having a primary winding with a mid-tap and a secondary winding with a mid-tap, a vibrator-switch unit having a control assembly which is electrically connected to be effective when the vibrator assembly is operated to connect a first one of said input terminals alternately to the two ends of said primary winding, circuit means connecting a second one of said input terminals to the mid-tap of said primary winding and to one of the output terminals, circuit means connecting said first input terminal to the mid-tap of said secondary winding, a full wave rectifier unit, and circuit means connecting the two ends of said secondary winding through said rectifier unit to the other output terminal whereby electrical power is delivered from said vibrator assembly through said transformer and, thence, is rectified by said rectifier and supplied to the load in series with electrical power received directly from the source of direct current.

2. A power supply system as described in claim 1 wherein said rectifier unit is in the form of a rectifier tube having a pair of anodes and a cathode with one anode connected to one end of the secondary winding and with the other anode connected to the other end of the secondary winding and with the cathode connected to the respective output terminal, a condenser connecting the mid-tap of the secondary winding with said cathode, and a filter assembly electrically connected at said output terminals to stabilize the effective voltage on the load.

3. A power supply system as described in claim 1 wherein said rectifier unit is in the form of a vibrator-rectifier actuated by the same source of mechanical power as said vibrator assembly.

ALFRED LEIFER.